Feb. 2, 1965 L. F. HILL, SR 3,168,328
TWO WAY SHOPPING CART
Filed Aug. 24, 1961
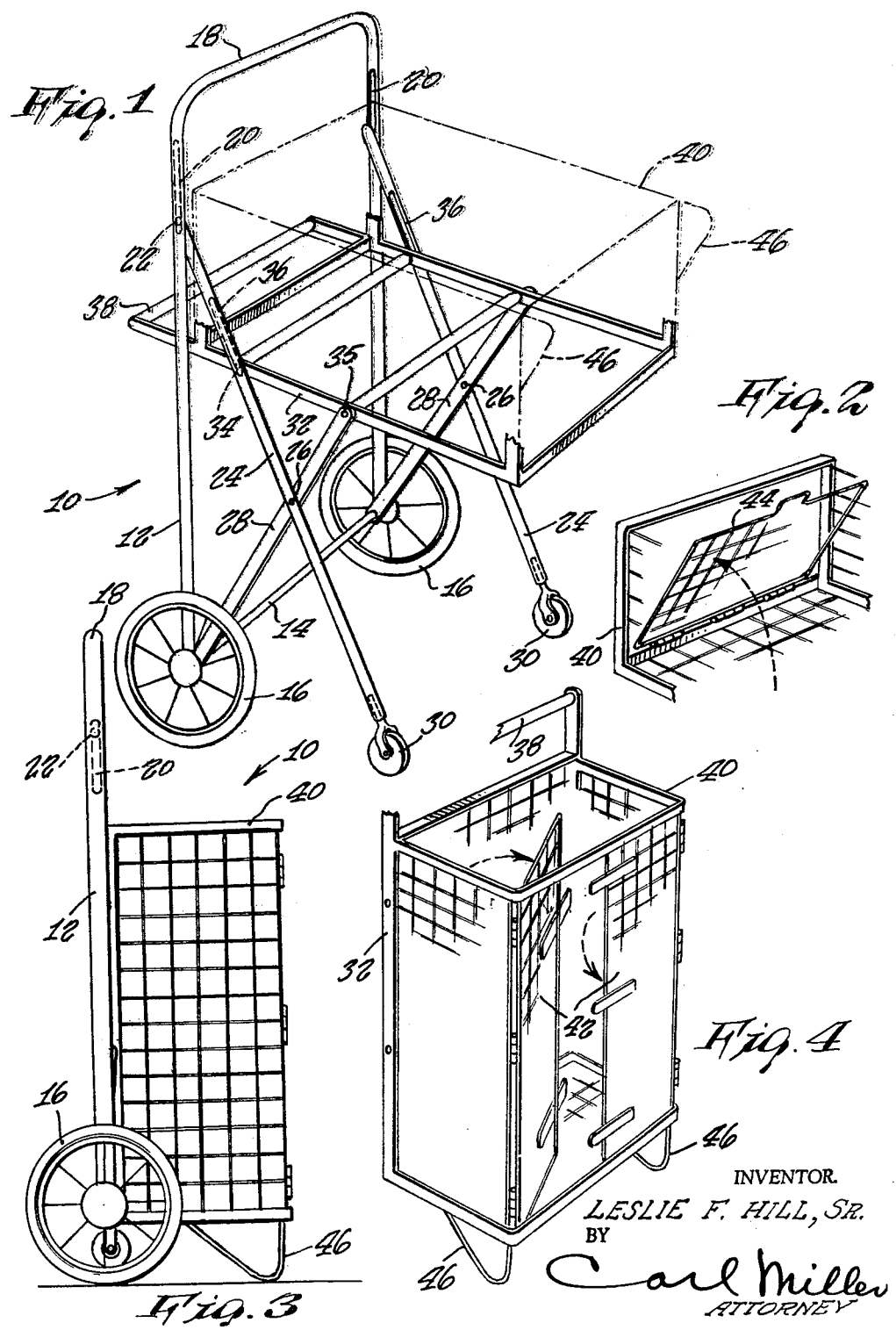
INVENTOR.
LESLIE F. HILL, SR.
BY
Carl Miller
ATTORNEY 3,168,328
TWO WAY SHOPPING CART
Leslie F. Hill, Sr., 105—32 192nd St., Hollis, N.Y.
Filed Aug. 24, 1961, Ser. No. 133,594
1 Claim. (Cl. 280—36)

This invention relates to shopping carts and more particularly to an adjustable shopping cart.

It is an object of the present invention to provide an adjustable shopping cart which can be readily converted between a horizontal and vertical position for various purposes.

A further object of the present invention is to provide a convertible shopping cart of the type described which can be readily maneuvered in close quarters, and which can be equally as well used in either a vertical or horizontal position for various shopping and transport purposes.

All of the foregoing and still further objects and advantages of this invention will become apparent from a study of the following specification, taken in connection with the accompanying drawing, wherein:

FIGURE 1 is a perspective view of the framework of a shopping cart made in accordance with the present invention in a horizontally adjusted position;

FIGURE 2 is a fragmentary perspective view of certain parts of a carrier forming a part of the present invention;

FIGURE 3 is a side elevational view of the assembly in a vertically adjusted position; and FIGURE 4 is a fragmentary perspective view of the various portions of the carrier forming a part of the present invention.

Referring now to the drawing, a shopping cart 10 made in accordance with the present invention is shown to include a main U-shaped frame 12 having an axle 14 extending across the free ends thereof upon which a pair of main supporting wheels 16 are rotatably supported. The upper bight portion 18 of the frame 12 forms a handle, directly beneath which a pair of vertical slots 20 slidably receive bearing pins 22 of a pair of auxiliary frame members 24 that are pivotally connected centrally upon a pivot pin 26 carried by upwardly extending support links 28 pivotally mounted at their lower ends upon the axle 14. The lowermost ends of the auxiliary members 24 support a pair of caster wheels 30 for facilitating the steering and maneuvering of the assembly.

A carrier support frame 32 has a pair of laterally outwardly extending bearing pins 34 slidably received within longitudinal slots 36 of the auxiliary frame members 24, with the central portion of the carrier frame pivotally supported by means of a pivot shaft 35 to the uppermost ends of the auxiliary frame member links 28. One end of the carrier frame 32 is provided with a transversely extending handle 38, thus facilitating adjustment of the position of the carrier basket 40 between the horizontal position shown in FIGURE 1 and the vertical position shown in FIGURE 3.

The carrier basket 40 includes a pair of top opening doors 42 and an end opening door 44, thus providing access to the interior of the carrier basket in either the horizontal or vertical position.

It will now be recognized that the device may be readily used in the horizontal position shown in FIGURE 1 for shopping purposes, after which, the device may be adjusted so as to place the carrier in the vertical position shown in FIGURE 3 for convenient transport purposes. Depending legs 46 integral with the carrier frame provides means for supporting the device in the vertical position without toppling over.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A shopping cart comprising:
(a) an inverted U-shaped frame having a bight at its upper end forming a cart handle and an axle at its lower end, the frame having a pair of spaced parallel slots each in one side thereof adjacent the bight;
(b) a pair of spaced wheels rotatably mounted on the axle for movement of the cart along a supporting surface;
(c) a pair of spaced link members each pivotally connected at its lower end to the lower end of one side of the frame;
(d) a pair of spaced auxiliary frame members each pivotally connected intermediate its ends to one of the link members between its ends and having its upper end movable in one of the slots of the inverted U-shaped frame;
(e) each auxiliary frame member having a slot intermediate its upper end and its pivotal connection to one of the link members;
(f) a pair of spaced caster wheels connected to the lower ends of the auxiliary frame members;
(g) a carrier including a basket disposed adjacent the inverted U-shaped frame at one end being pivotally connected intermediate its ends to the upper ends of the link members for movement thereby between a vertical position and a horizontal position, and having means between its end adjacent the inverted U-shaped frame and its pivotal connection to the link members movable in the slots of the auxiliary frame members for guiding the carrier; and
(h) the carrier having a handle at its end adjacent the inverted U-shaped frame rotatable into the plane of the inverted U-shaped frame when the carrier is moved to its vertical position.

References Cited in the file of this patent
UNITED STATES PATENTS

| | | |
|---|---|---|
| 2,141,881 | Schray | Dec. 27, 1938 |
| 2,212,053 | Smith | Aug. 20, 1940 |
| 2,284,801 | Conger | June 2, 1942 |
| 2,393,149 | Cunningham | Jan. 15, 1946 |
| 2,590,048 | Sides | Mar. 18, 1952 |
| 2,589,044 | Brodeck | Mar. 11, 1952 |
| 2,754,889 | Lovelace | July 17, 1956 |
| 2,809,047 | Strohmaier | Oct. 8, 1957 |

FOREIGN PATENTS

| | | |
|---|---|---|
| 869,564 | France | Feb. 5, 1942 |